United States Patent
Warnes

(10) Patent No.: US 12,021,443 B2
(45) Date of Patent: Jun. 25, 2024

(54) REVERSE POLARITY PROTECTION CIRCUIT FOR A DC-DC CONVERTER

(71) Applicant: Murata Manufacturing Co., Ltd., Nagaokakyo (JP)

(72) Inventor: Frank Warnes, Milton Keynes (GB)

(73) Assignee: MURATA MANUFACTURING CO., LTD., Kyoto (JP)

( * ) Notice: Subject to any disclaimer, the term of this patent is extended or adjusted under 35 U.S.C. 154(b) by 329 days.

(21) Appl. No.: 17/478,123

(22) Filed: Sep. 17, 2021

(65) Prior Publication Data

US 2022/0006374 A1    Jan. 6, 2022

Related U.S. Application Data

(63) Continuation of application No. PCT/GB2020/050761, filed on Mar. 20, 2020.

(30) Foreign Application Priority Data

Mar. 21, 2019 (GB) .................................... 1903910

(51) Int. Cl.
*H02M 1/32* (2007.01)
*B60L 53/20* (2019.01)
(Continued)

(52) U.S. Cl.
CPC ............... *H02M 1/32* (2013.01); *B60L 53/20* (2019.02); *H02H 11/003* (2013.01);
(Continued)

(58) Field of Classification Search
CPC .......... H02H 3/00; H02H 3/18; H02H 11/003; H02H 7/1213; H02H 11/00; H02M 1/32;
(Continued)

(56) References Cited

U.S. PATENT DOCUMENTS

| 5,642,251 A | 6/1997 | Lebbolo et al. |
| 5,764,465 A | 6/1998 | Mattes et al. |

(Continued)

FOREIGN PATENT DOCUMENTS

| DE | 195 06 074 A1 | 9/1996 |
| DE | 100 13 939 A1 | 9/2001 |

(Continued)

OTHER PUBLICATIONS

Official Communication issued in International Patent Application No. PCT/GB2020/050761, mailed on Jul. 2, 2020.

*Primary Examiner* — Danny Nguyen
(74) *Attorney, Agent, or Firm* — Keating & Bennett, LLP

(57) ABSTRACT

A reverse polarity protection circuit of a DC-DC converter includes an inductive component. When the DC-DC converter is connected to a power supply with correct polarity, the inductive component of the converter receives power via a body diode of a protection switch. Once the inductive component begins to charge and discharge under control of a driving switch, the protection switch turns on and allows full power to be provided to the inductive component. When the DC-DC converter is connected with reverse polarity, a clamping switch fed by the power supply turns on and connects a control input of the protection switch to ground, turning off the protection switch. The clamping switch is protected by a switch protection device to lower the voltage difference between a control input of the clamping switch and an input of the clamping switch.

19 Claims, 6 Drawing Sheets

(51) Int. Cl.
*H02H 11/00* (2006.01)
*H02M 3/158* (2006.01)

(52) U.S. Cl.
CPC ......... *H02M 3/158* (2013.01); *B60L 2210/12* (2013.01); *B60L 2210/14* (2013.01)

(58) Field of Classification Search
CPC ................ H02M 3/158; B60L 2210/12; B60L 2210/14; B60L 53/20
USPC .......................................................... 361/84
See application file for complete search history.

(56) References Cited

U.S. PATENT DOCUMENTS

| | | | |
|---|---|---|---|
| 6,304,422 B1 | 10/2001 | Sander et al. | |
| 6,611,410 B1 | 8/2003 | Makaran | |
| 7,126,801 B2 * | 10/2006 | Jokinen | H02H 11/003 361/85 |
| 9,124,096 B2 * | 9/2015 | Johnson | H02H 11/002 |
| 2003/0081365 A1 | 5/2003 | He | |
| 2006/0250737 A1 * | 11/2006 | Sasitornwannakul | H02H 7/1213 361/82 |
| 2012/0081816 A1 * | 4/2012 | Mazzarisi | H02H 9/041 361/18 |
| 2013/0100710 A1 * | 4/2013 | Kang | H02H 7/125 361/118 |
| 2017/0077804 A1 * | 3/2017 | Wüstenhagen | H02M 3/158 |
| 2019/0103867 A1 | 4/2019 | Sugisawa | |

FOREIGN PATENT DOCUMENTS

| | | |
|---|---|---|
| JP | 2016-189654 A | 11/2016 |
| WO | 99/54983 A1 | 10/1999 |
| WO | 2017/175578 A1 | 10/2017 |

* cited by examiner

REVERSE POLARITY PROTECTION CIRCUIT FOR A DC-DC CONVERTER

CROSS REFERENCE TO RELATED APPLICATIONS

This application claims the benefit of priority to GB Patent Application No. 1903910.6 filed on Mar. 21, 2019 and is a Continuation Application of PCT Application No. PCT/GB2020/050761 filed on Mar. 20, 2020. The entire contents of each application are hereby incorporated herein by reference.

BACKGROUND OF THE INVENTION

1. Field of the Invention

The present invention relates to a reverse polarity protection circuit for a DC-DC converter, particularly for use in automotive applications.

2. Description of the Related Art

Vehicles, particularly internal combustion engine powered vehicles, typically include a standard 12 V battery of a starter motor, ignition, and/or of ancillary electrics in a vehicle. There exists a mismatch between the power required of a set of electronics, such as an ECU (engine control unit), and the power that can be supplied by a vehicle battery, in that the voltage output by a vehicle battery is subject to change while the voltage required by the vehicle electronics is constant. Furthermore, the voltage required by the vehicle electronics may be higher or lower than the voltage supplied by the battery.

To address this, a DC-DC converter is typically included to regulate the voltage supplied to electronics of the vehicle. A DC-DC converter of the type used in a vehicle is typically a solid state converter which bucks or boosts voltage by storing and discharging energy in one or more inductors. The charge-discharge cycle is regulated by a semiconductor switch, such as a transistor.

The converter is a sensitive piece of electronic equipment. Reverse connection, i.e., applying a positive voltage to the negative input and 0 V to the positive input, can damage components of the converter.

It would be desirable to provide a reverse polarity protection circuit that can be used in a DC-DC converter. This problem has been appreciated in the prior art, and various prior art solutions are available, some of which are outlined below.

A first prior art solution is to provide a forward biased diode in series with the power source, and typically connected (i.e., connected with correct polarity) to the positive output of the power source. When the power source is reverse connected (i.e., connected with reverse polarity) the diode is reverse biased and operates like an open switch. Diodes have a set voltage drop across the diodes, and some power is dissipated by the diode when in use.

A second prior art solution is to provide a reverse biased diode in parallel with the power source, connected across the power source, with a fuse typically connected between the positive terminal of the power source and the cathode of the diode. When the power source is correctly connected, no current flows through the diode as it is reverse biased, and the power is dissipated across the converter and load. When the power source is reverse connected, the diode creates a short circuit back to the fuse, and the fuse will blow. This means that the fuse has to be replaced before the circuit can be reconnected.

A third prior art solution is to provide a relay switch and coil between the power source and the converter, with the switch typically connected to the positive output of the power supply. A diode is then also typically connected to the positive output of the power supply, and when correctly connected the power supply energizes the coil and closes the switch. When the power source is reverse connected the diode prevents the coil circuit from operating. This solution is not particularly suited to an automotive application, as the relay generally has a short life span, and is highly susceptible to failure due to vibrations.

A fourth prior art solution uses a P-channel MOSFET typically connected to the positive output from the power supply. When the power source is correctly connected, the gate of the MOSFET is pulled low with respect to the source, and so the transistor is biased on. When reverse connected, the gate is pulled high with respect to the source and the transistor presents an open circuit. The P-channel MOSFET has an internal resistance which creates a power loss at the converter and the eventual load. N-channel MOSFETs have a lower internal resistance.

Fifth and sixth prior art solutions use N-channel MOSFETs. One solution uses an N-channel MOSFET typically connected to the positive output of the power source. As the source of the MOSFET is typically connected to the positive side, a separate higher voltage is needed to bias the MOSFET gate on. This requires a separate isolated DC-DC converter, which is costly.

A further solution uses an N-channel MOSFET typically connected to the 0 V output of the power source. This works in the same way as the P-channel MOSFET, but in reverse. However, in automotive applications, the input 0 V and the output 0 V are both connected to the chassis of the vehicle. Thus, the DC-DC converter itself must be an isolated converter which results in a higher cost and a lower efficiency. An isolated DC-DC converter will be described below with reference to FIG. 1.

It would be desirable to provide a solution to the problems with the prior art discussed above.

SUMMARY OF THE INVENTION

Preferred embodiments of the present invention provide a reverse polarity protection circuit for a DC-DC converter, the reverse polarity protection circuit includes an isolating circuit including a protection switch including a control input, the isolating circuit is configured to connect to a first supply line of the DC-DC converter, and operable to control current flow in the first supply line via the control input of the protection switch and a clamping circuit including a clamping switch including a control input, the clamping circuit is configured to selectively connect the control input of the protection switch to the first supply line; wherein, when the DC-DC converter is connected to a power supply with correct polarity, the isolating circuit allows current to flow in the first supply line, and when the DC-DC converter is connected with reverse polarity, the clamping circuit turns off the protection switch to block current flow in the first supply line, and a voltage limiting circuit configured to reduce a voltage between the control input of the clamping switch and the first supply line of the DC-DC converter.

When the DC-DC converter is connected to a power supply with correct polarity, the isolating circuit allows current to flow in the first supply line, and when the DC-DC converter is connected with reverse polarity, the clamping circuit turns off the protection switch to block current flow in the first supply line. The reverse polarity protection circuit also may include a voltage limiting circuit which reduces a voltage between the control input of the clamping switch and the first supply line of the DC-DC converter.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

In brief, a reverse polarity protection circuit is provided for a DC-DC converter, where an N-channel MOSFET is typically connected to a positive line of a DC-DC converter.

A DC-DC converter is a voltage converter which takes an input voltage of a particular or varying voltage and produces a stable voltage at the output of a different magnitude. A number of DC-DC converters have a coil of some description as one of the first components in the circuit. Some converters are non-isolated, and include an inductor. Other converters are isolated and include a transformer. In either example, the primary coil operates as an inductor.

To produce an output voltage of a higher magnitude, the inductor of a converter operates in series with the supply voltage to produce a voltage with a magnitude of the input voltage plus the inductor voltage. The inductor can store energy in the form of a magnetic field, and depending on whether the inductor is connected to ground or not, the energy is either stored or dissipated. When the inductor is connected to the remainder of a circuit it provides this increased voltage in pulses, the duration of which can be dictated by a pulse driving switch of the converter connected between the second side of the coil and the negative terminal of a voltage source. Depending on the type of circuit, this can be provided to a second inductor, a smoothing capacitor, or via a magnetic linkage to a secondary coil.

Figure 1:
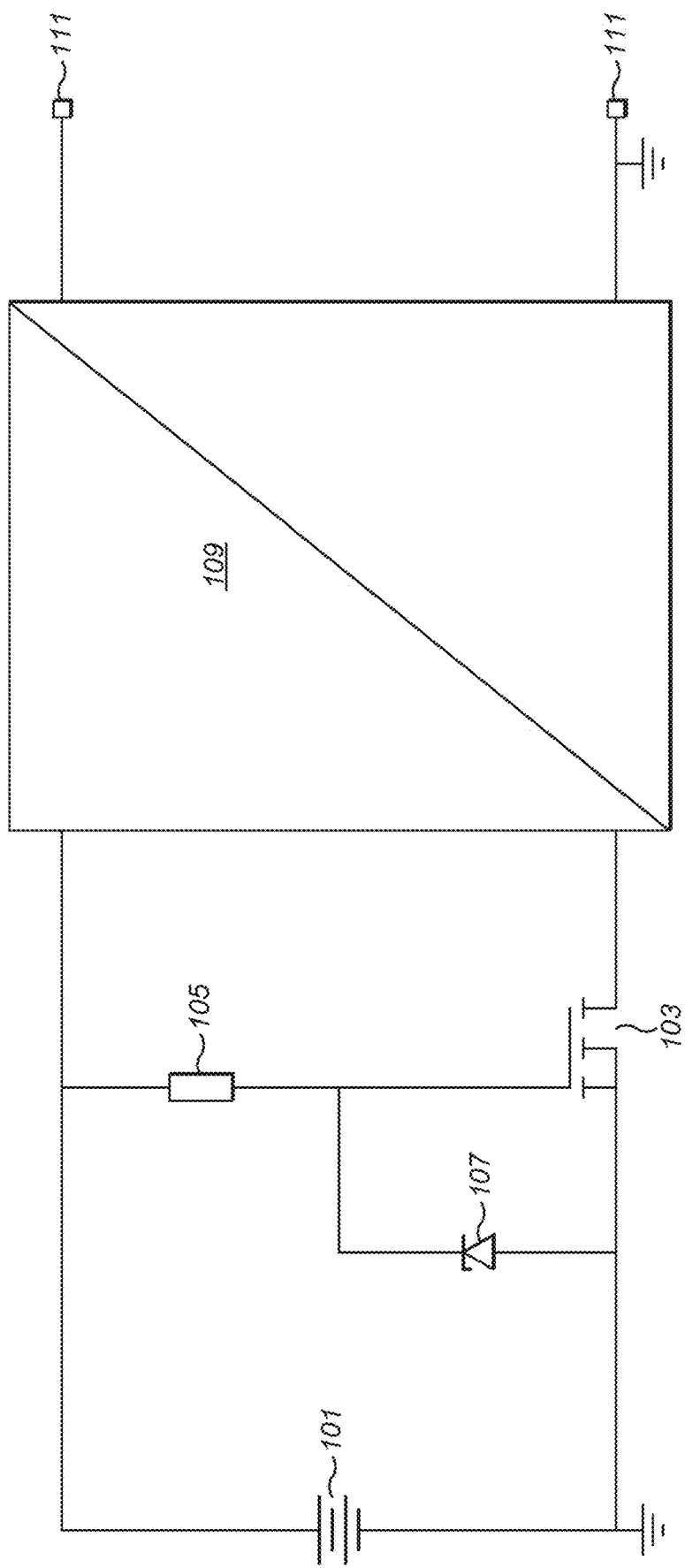
FIG. 1 shows a prior art solution to the problem of reverse polarity protection for an automotive DC-DC converter.

FIG. 1 shows a prior art example of a reverse polarity protection circuit for a DC-DC converter. A power supply 101 provides power to an isolated DC-DC converter 109 when connected with the correct polarity. The DC-DC converter includes terminals 111. The body diode of N-channel MOSFET 103 allows current to flow back from the isolated converter 109 as soon as the power source 101 is connected. The power source 101 supplies a voltage to the gate of MOSFET 103 through the resistor 105. Zener diode 107 is present to prevent the gate of MOSFET 103 from exceeding its maximum voltage.

The source of MOSFET 103 is typically connected to ground, and therefore the MOSFET 103 is biased ON in normal operation.

If the power source 101 is connected with reverse polarity, the source of MOSFET 103 is connected to the positive output of power source 101, while the gate is connected though resistor 105 to ground. This biases the MOSFET 103 OFF so the converter cannot operate. The MOSFET 103 therefore provides a reverse polarity protection function.

The problem with this approach is that automotive applications often have a common ground reference for all circuits, such as the chassis or bodywork of the vehicle. This would therefore short out MOSFET 103, rendering the reverse polarity protection circuit useless. To avoid this problem, the DC-DC converter 109 must be an isolated converter, incorporating a transformer in the topology, which is costly, heavy, and increases inefficiencies in the DC-DC converter 109.

Figure 2:
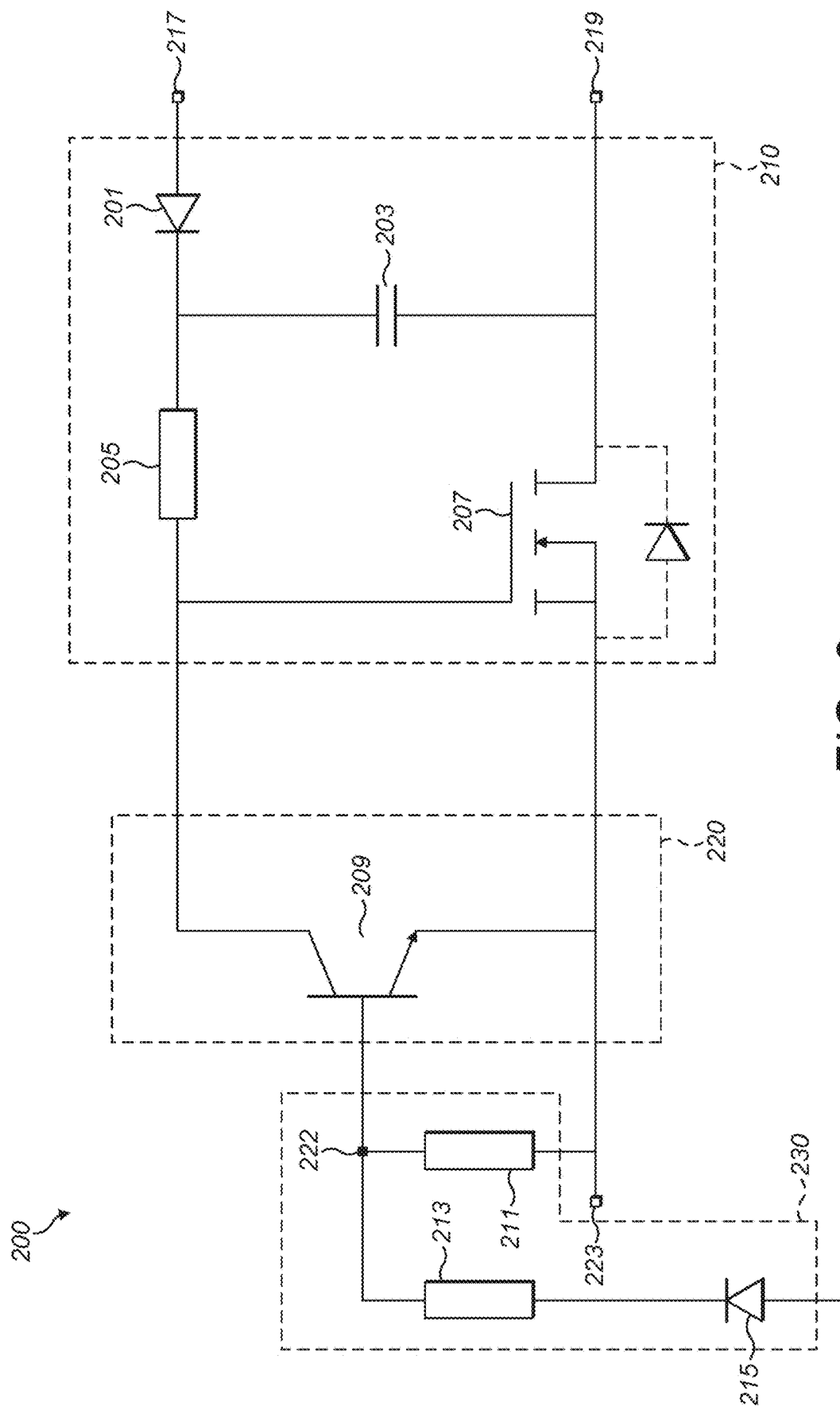
FIG. 2 shows a preferred embodiment of the present invention which can be applied to a SEPIC converter.

A preferred embodiment of the present invention will now be described in more detail with regard to FIG. 2. FIG. 2 shows a reverse polarity protection circuit 200 which can be applied to a DC-DC converter (not shown).

As shown in FIG. 2, a leakage current limiting diode or rectifier 215 is connected to terminal 221, with resistor 213 connected to diode 215. Base resistor 211 is connected at one end to resistor 213 to define a node 222, and at the other end to terminal 223. Terminals 221 and 223 are connected respectively to the negative or ground, and positive inputs of a power supply (not shown).

The node 222 between base resistor 211 and resistor 213 is connected to the base of clamping switch or transistor 209. Clamping transistor 209 is a Bipolar Junction Transistor (BJT) or Field Effect Transistor (FET). One advantage of using a BJT however is the relatively high cost compared to a FET. The emitter of clamping transistor 209 is connected to the terminal 223. The collector of clamping transistor 209 is connected to the gate of a protection switch or transistor 207 and to a first end of current limiting resistor 205. Protection transistor 207 should ideally be a metal oxide semiconductor Field Effect Transistor, as a body diode is required to start the converter before the protection transistor 207 is turned on. However, a different transistor can be used as long as a diode is connected in parallel across the drain and the source or across the collector and the emitter. The source of protection transistor 207 is connected to terminal 223, and the drain is connected to terminal 219. Protection transistor 207 has a body diode (shown in dotted lines) allowing current to pass from the source to the drain.

The second end of current limiting resistor 205 is connected to the cathode of diode 201, and to smoothing capacitor 203. The anode of diode 201 is then connected to terminal 217 of the circuit, which is designed to be connected after the coil in a DC-DC converter. The other side of smoothing capacitor 203 is connected to terminal 219, which is designed to be connected before the coil of a DC-DC converter. This is illustrated in the later diagrams.

The circuit can be considered as being in three sections. The first section, shown within dotted line box 210, includes rectifier or diode 201, smoothing capacitor 203, current limiting resistor 205, and protection transistor 207. The aim of this portion is to allow or prevent a connected DC-DC converter from operating, depending on whether a power source of the converter is connected correctly or is connected in reverse. The protection transistor 207 allows current to flow when a power supply of a DC-DC converter is connected correctly, by turning OFF when connected to the positive power rail via terminal 223. The protection transistor 207 blocks current when it is connected to a negative power rail, such as when a power supply of a DC-DC converter is reverse polarity connected. Section 210 therefore includes an isolating circuit that prevents a reverse voltage being applied to the input terminals of the DC-DC converter.

The second section, shown within dotted line box 220 includes a clamping transistor or switch 209. The aim of this portion is to short circuit the gate of the protection transistor 207 to disconnect power from the converter circuit and prevent damage to the converter. As described later, this prevents a reverse voltage being applied to the converter. Section 220 therefore includes a clamping circuit.

Finally, in a third section, a clamping transistor protection resistor 211 is provided, which connects the base of clamping transistor 209 to the positive power rail via terminal 223. The aim of resistor 211 is to prevent damage to the clamping transistor 209 caused by a high emitter to base voltage during normal operation if diode 215 allows any reverse leakage current. The clamping transistor protection resistor 211, the resistor 213, and the leakage current limiting diode 215 are all part of a voltage limiting circuit 230, arranged between the respective terminals 221 and 223 and the gate of the transistor 209.

The particular protection circuit described in FIG. 2 is appropriate for a converter which can supply a regulated output from the output of a coil, such as a SEPIC converter. Converters such as a boost or buck converter provide an un-regulated output from the coil, and so additional circuitry is required to protect the protection circuit.

The preferred embodiment of FIG. 2 relates to a protection circuit than can be applied to, for instance, a SEPIC converter. The operation of such a converter is described with reference to FIG. 3 (correct connection) and FIG. 4 (reverse connection). The same elements in FIGS. 2, 3, and 4 are given the same reference numbers where possible, except for a different first digit to indicate the respective figure number.

Figure 3:
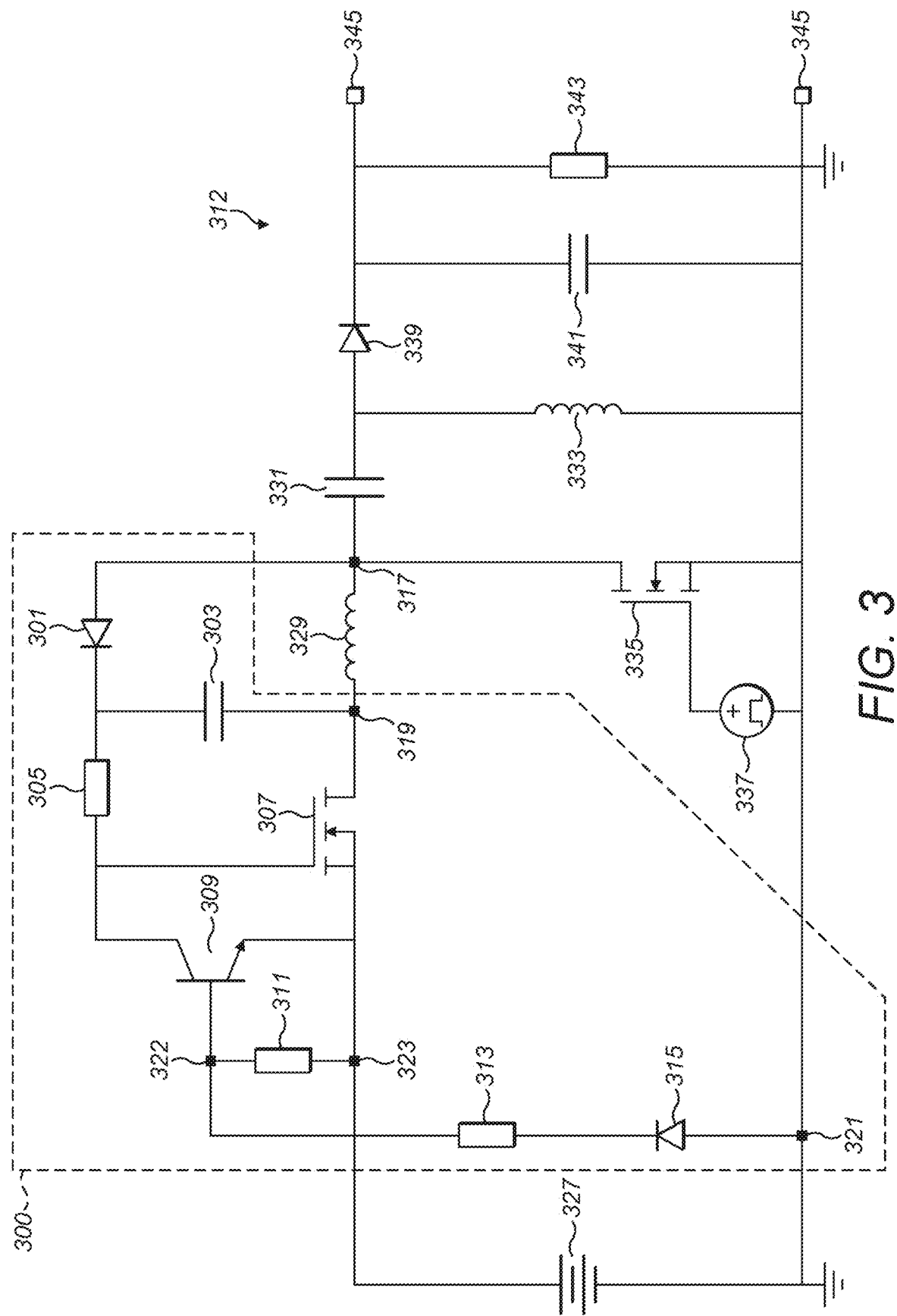
FIG. 3 shows a preferred embodiment of the present invention connected to a SEPIC converter connected with correct polarity.

FIG. 3 shows an exemplary DC-DC converter including the reverse polarity protection circuit 300 of FIG. 2. The reverse polarity protection circuit is shown enclosed with a dotted line in box 300. The terminals 323 and 321 of the protection circuit are connected across the power source 327 from positive to negative. The connection of the reverse polarity protection circuit 300 to an exemplary converter is also shown in FIG. 4 (reverse connection).

The preferred embodiment described above with reference to FIG. 2 makes reference to the "positive" connection on a power source; however, the circuit is for reverse polarity protection. As such, references to connections to the positive connection on a power source apply only when a power source of a DC-DC converter is connected correctly in normal operation of the DC-DC converter. In exceptional circumstances, when the circuit is protecting a converter from reverse polarity protection of a power source, terminals 321 and 323 will be connected to the power source from positive to negative.

Figure 4:
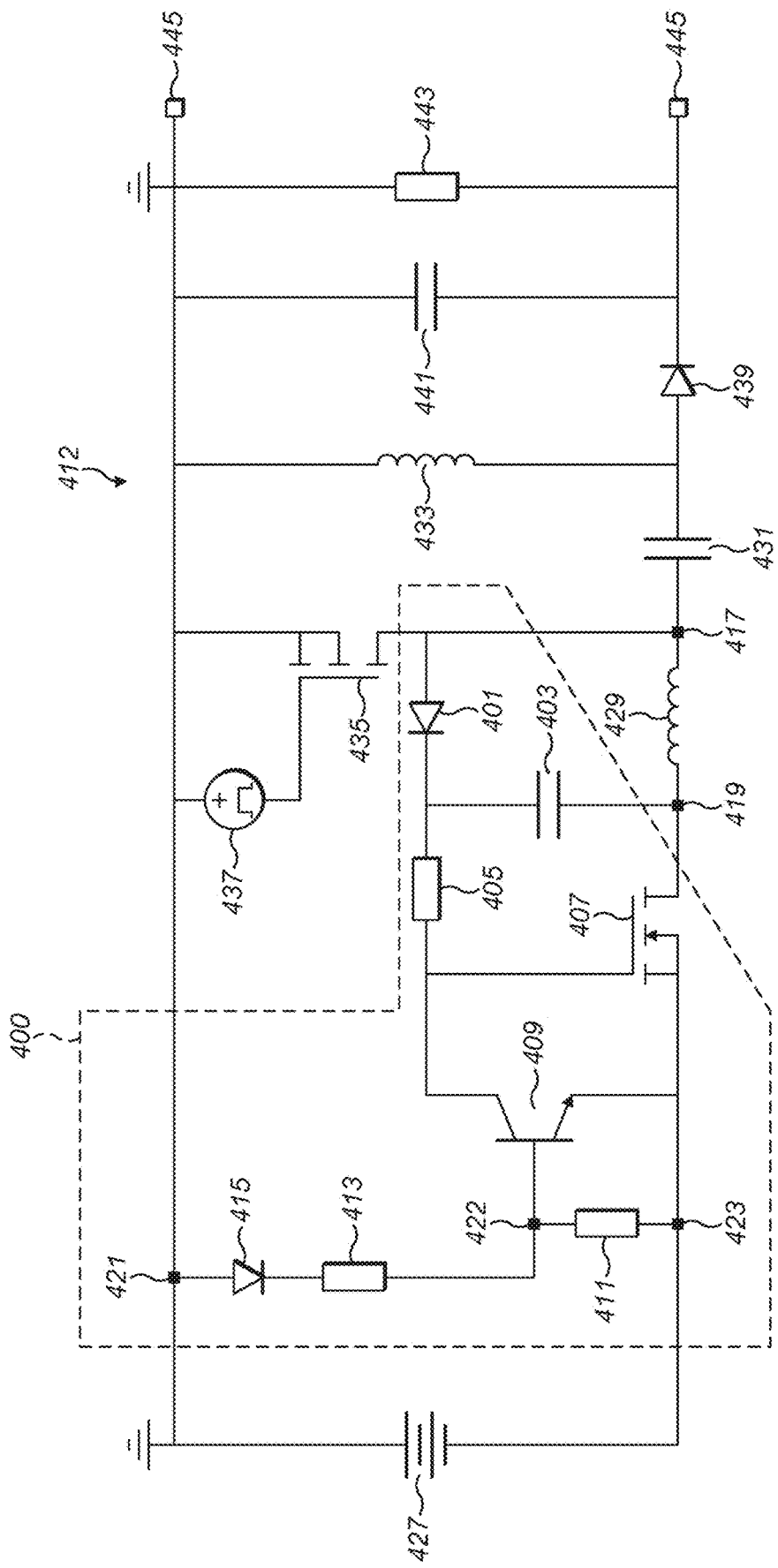
FIG. 4 shows a preferred embodiment of the present invention connected to a SEPIC converter connected with reverse polarity.

Because in the reverse polarity connection scenario described above, the remainder of the circuit is the same as if correctly connected to a power source, terminals 321 and 323 will still be connected across the coil of a converter, as shown in FIGS. 3 and 4. In FIG. 4, the terminals are labelled as 419 and 417 connected across inductor or coil 429.

When connected to a DC-DC converter correctly connected to a power source, as shown in FIG. 3, the operation of the reverse polarity protection circuit is as follows.

A voltage Vs from a voltage source 327 is applied to a DC-DC converter 312 (described below). This is applied to one side of base resistor 311, the emitter of clamping transistor 309, and the source and body diode of transistor 307, through terminal 323.

A voltage is also applied to one side of the capacitor 303 and to output terminal 319, the voltage being the supply voltage $V_s$ minus the body diode voltage $V_{307d}$: $V_{319}=V_s-V_{307d}$.

Voltage $V_{319}$ is then supplied to the remainder of the DC-DC converter 312. The body diode of protection transistor 307 initially means that the converter is not supplied with the full voltage of $V_s$, and as such the efficiency of the converter is lowered.

The terminal 319 is connected to a first side of a coil 329 of a DC-DC converter, and the coil 329 initially receives a voltage of $V_{319}$. As noted above this voltage can then be increased by the DC-DC converter.

Terminal 317 of the reverse protection circuit 300 which is connected to the second side of the coil 329 receives this voltage in pulses and supplies the voltage through the diode 301 and to the smoothing capacitor 303. Smoothing capacitor 303 turns the pulsed voltage into an approximate DC voltage, which is equivalent to the voltage output by the DC-DC converter $V_{out}$ across the load 343.

The DC voltage at the diode 301 output is therefore equal to: $V_{319}+V_{out}=V_{301}$, where $V_{out}$ is the output voltage across the load 343, supplied by the coil inductor 329.

Voltage $V_{301}$ is applied to the current limiting resistor 305 and subsequently to the gate of protection transistor 307 as voltage $V_{305}$. As stated above, the source terminal of protection transistor 307 is supplied with voltage $V_s$. Therefore, the higher voltage $V_{305}$ biases the protection transistor 307 ON, which bypasses the body diode of transistor 307, removing the voltage drop across it and supplying the coil of the DC-DC converter with the full voltage of $V_s$.

Thus, when the protection circuit 300 is applied to a DC-DC converter 312 with a correctly connected power source 327, the protection transistor 307 allows the DC-DC converter 312 to operate with minimal voltage drop across the protection circuit 300. As noted above, it is advantageous to use an N-channel MOSFET in this circuit, as it has a much lower voltage drop than a P-channel MOSFET.

In this scenario, the second portion of the protection circuit, the clamping circuit 220 does not operate. The clamping transistor 309 is turned off because the base of clamping transistor 309 is fed a lower voltage than the emitter, and thus no current can flow from the collector to the emitter. Resistor 311 ensures however that the voltage applied to the base of the clamping transistor 309 is sufficiently high enough to prevent damage to the clamping transistor 309. For some bipolar junction transistors, an excessive voltage across the emitter to the base can damage the transistor. By essentially creating a voltage divider though resistors 311 and 313, and connecting the base of clamping transistor 309 to the middle junction of the resistors 311 and 313 at node 322, a voltage lower than the supply voltage (and therefore lower than the emitter voltage), but high enough to reduce or minimize the base to emitter to base voltage, is provided.

Resistor 313 also does not draw any current as diode 315 is reverse biased. This prevents leakage current between the positive and neutral supply rails of the converter, caused by the connection between the two rails by resistors 311 and 313.

Referring to FIG. 3, the DC-DC converter will now be described in more detail. Power supply 327 supplies a positive voltage to the positive supply line, which is connected to terminal 323 of the reverse polarity protection circuit 300. Terminals 319 and 317 are shown connected across the primary inductor or coil 329. In this configuration, 12 V is presented to the inductor 329 as the protection transistor 307 is biased ON.

Transistor 335, acting as a pulse driving switch, is fed by a gate driver 337, and selectively connects the primary inductor 329 to ground. When the transistor 335 is turned ON, energy is stored in both the primary inductor 329 and the capacitor 331. Capacitor 331, charged while the transistor 335 is ON, supplies energy to secondary inductor 333 to increase the energy stored in the secondary inductor 333.

When the transistor 335 is turned OFF, energy stored in the secondary inductor 333 is added to the energy stored in the primary inductor 329 to boost the energy supplied to the load 343.

Over the duty cycle of the gate driver 337 and transistor 335, the voltage at terminal 317 will rise to higher than the input voltage and then drop down to 0 V, depending on whether the transistor 335 is ON or OFF. The capacitor 303 of the reverse polarity protection circuit 300 smooths this oscillating voltage to create a constant voltage higher than the input voltage. It is this voltage which biases the gate of protection transistor 307 ON, as it will be higher than the voltage presented to the source of protection transistor 307.

Diode 339 and capacitor 341 define and function as a rectifying and smoothing circuit to provide a smooth DC output at the output terminals 345.

A preferred embodiment of the present invention connected to an exemplary converter, when the converter is connected with reverse polarity, is shown in FIG. 4. It will be appreciated that the configuration of FIG. 4 represents an incorrect connection.

When the protection circuit 400 is applied to a DC-DC converter 412 in which the power source has been connected in reverse, it prevents damage to the DC-DC converter 412. The operation of the reverse polarity protection circuit in this scenario is as follows.

A voltage from the voltage source 427 is applied to the DC-DC converter 412, with the positive output of the voltage source 427 being applied to the source and body diode of a transistor 435 of the DC-DC converter 412. Because the body diode of the transistor 435 is forward biased, current can flow to an inductor 429 of the converter and thus to terminals 417 and 419 of the protection circuit 400. Diode 401 is now forward biased, and allows current to flow through current limiting resistor 405 and to the gate of protection transistor 407. Current is also presented at the collector of clamping transistor 409 and to one side of smoothing capacitor 403.

If only the first portion (210 in FIG. 2) of the circuit 400 were present, protection transistor 407 would switch on because the voltage presented at the source is 0 V. This would allow a large reverse voltage to be presented at the drain of the transistor 435, and other components, of the DC-DC converter, damaging the converter.

The second portion (220 in FIG. 2) of the protection circuit 400 operates to switch off the protection transistor 407. Current limiting diode 415 allows current to flow through resistor 413 to the base of clamping transistor 409. The emitter of the clamping transistor 409 is connected to the terminal 423, which is now connected to the negative side of a power supply of the DC-DC converter. This then biases the clamping transistor 409 ON, allowing current to flow to ground through diode 401 and the current limiting resistor 405.

This then connects the gate of protection transistor 407 to ground, biasing the protection transistor 407 OFF and disconnecting the DC-DC converter circuit 412 from the power source. Current can now only flow through the diode 401, current limiting resistor 405 and clamping transistor 409.

The maximum current flowing through the body diode of the transistor 435 is therefore dictated by resistor 405, which may have a value of around 10 kΩ. This means the current through the body diode of the pulse driving switch, i.e., transistor 435, will be in the region of milliamps, depending on the input voltage. This protects the transistor 435 of the DC-DC converter 412.

Protection transistor 407 can be an N-channel MOSFET, but can also be an NPN bipolar junction transistor with a separate diode connected across the NPN bipolar junction transistor, to replicate the effect of the intrinsic body diode of a MOSFET. Clamping transistor 409 can be a bipolar junction transistor, but can also be an N-channel MOSFET.

Referring to FIG. 4, the operation of the DC-DC converter 412 in this configuration will now be described in more detail. Voltage supplied by the reverse connected power supply 427 can flow through a body diode of transistor 435, through diode 401 and current limiting resistor 405 and to the gate of protection transistor 407. This would bias the protection transistor 407 ON. However, a voltage $V_{413}$ is also presented across the base/emitter of clamping transistor 409, which biases the clamping transistor 409 ON and allows current to flow through the clamping transistor 409 to ground. This essentially connects the gate of protection transistor 407 to 0 V, biasing the clamping transistor 409 OFF, and breaking the return path of current to the power supply 427.

Thus, a reverse polarity protection circuit 200, 300, and 400 has been described above with reference to FIGS. 2, 3 and 4.

Figure 5:
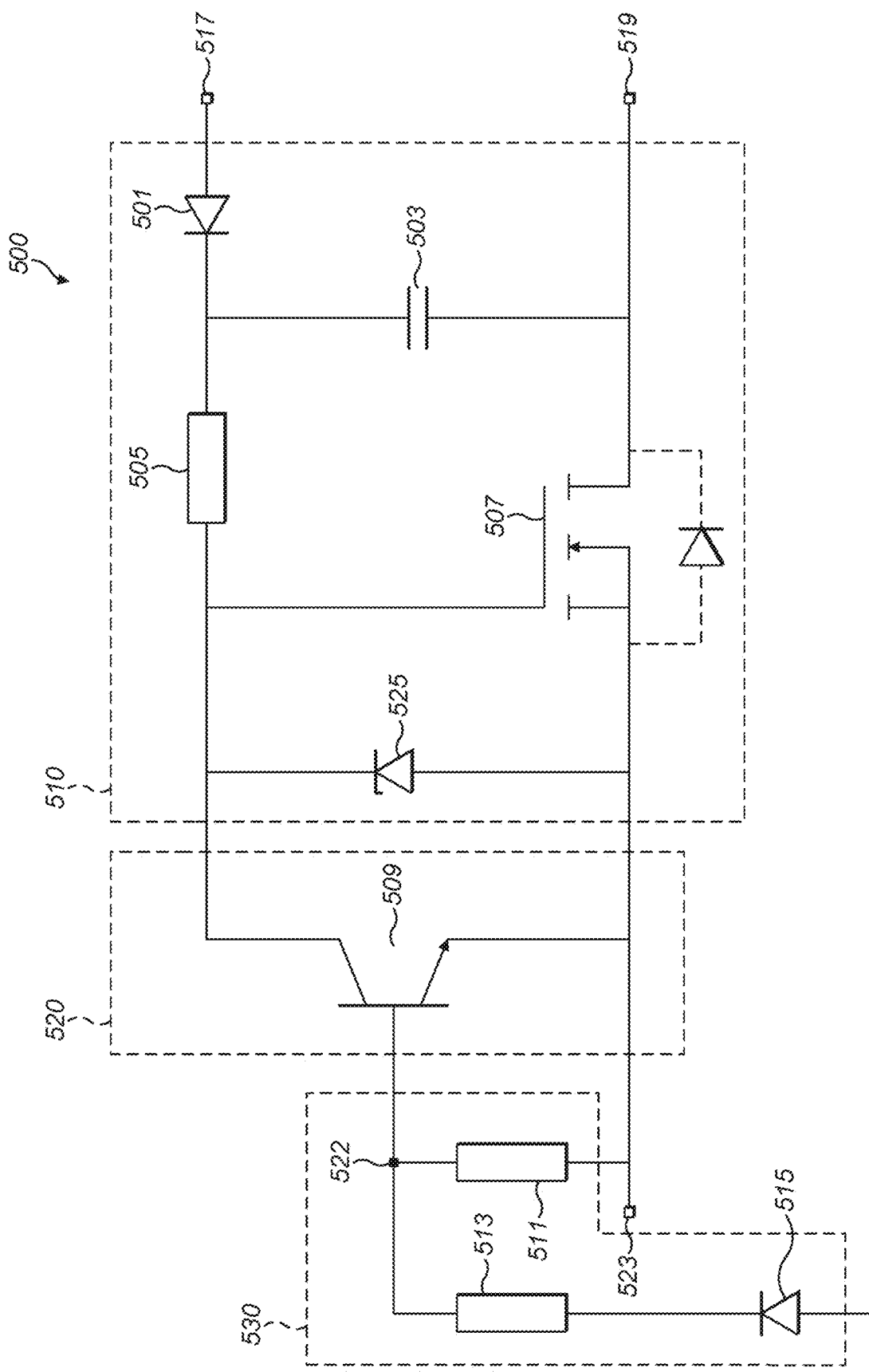
FIG. 5 shows a preferred embodiment of the present invention which can be applied to a Buck, Boost, or Buck-Boost converter.

FIG. 5 shows an alternative preferred embodiment of a reverse polarity protection circuit 500 which is suitable for connection to an un-regulated output from a DC-DC converter, such as that presented by a Boost or Buck type converter. As before, a reverse polarity protection circuit 500 includes first and second sections forming an isolating circuit 510, a clamping circuit 520, and a voltage limiting circuit 530.

The reverse polarity protection circuit 500 operates in exactly the same manner as the reverse polarity protection circuit 200 of FIG. 2. However, a reverse biased Zener diode 525 is placed across the gate to source junction of transistor 507. If the voltage applied to the gate of the protection transistor 507 becomes higher than the Zener breakdown voltage, the Zener diode 525 allows current to bypass the protection transistor 507 and not damage the gate of the protection transistor 507.

If connected to a DC-DC converter with a reverse polarity connected power supply, the Zener diode 525 is shorted by the clamping transistor 509.

The Zener diode is not required in the circuit of FIG. 2, as the voltage to the gate of protection transistor 207 is regulated and equivalent to $V_{out}$ (which is about 12 V in this example).

Figure 6:
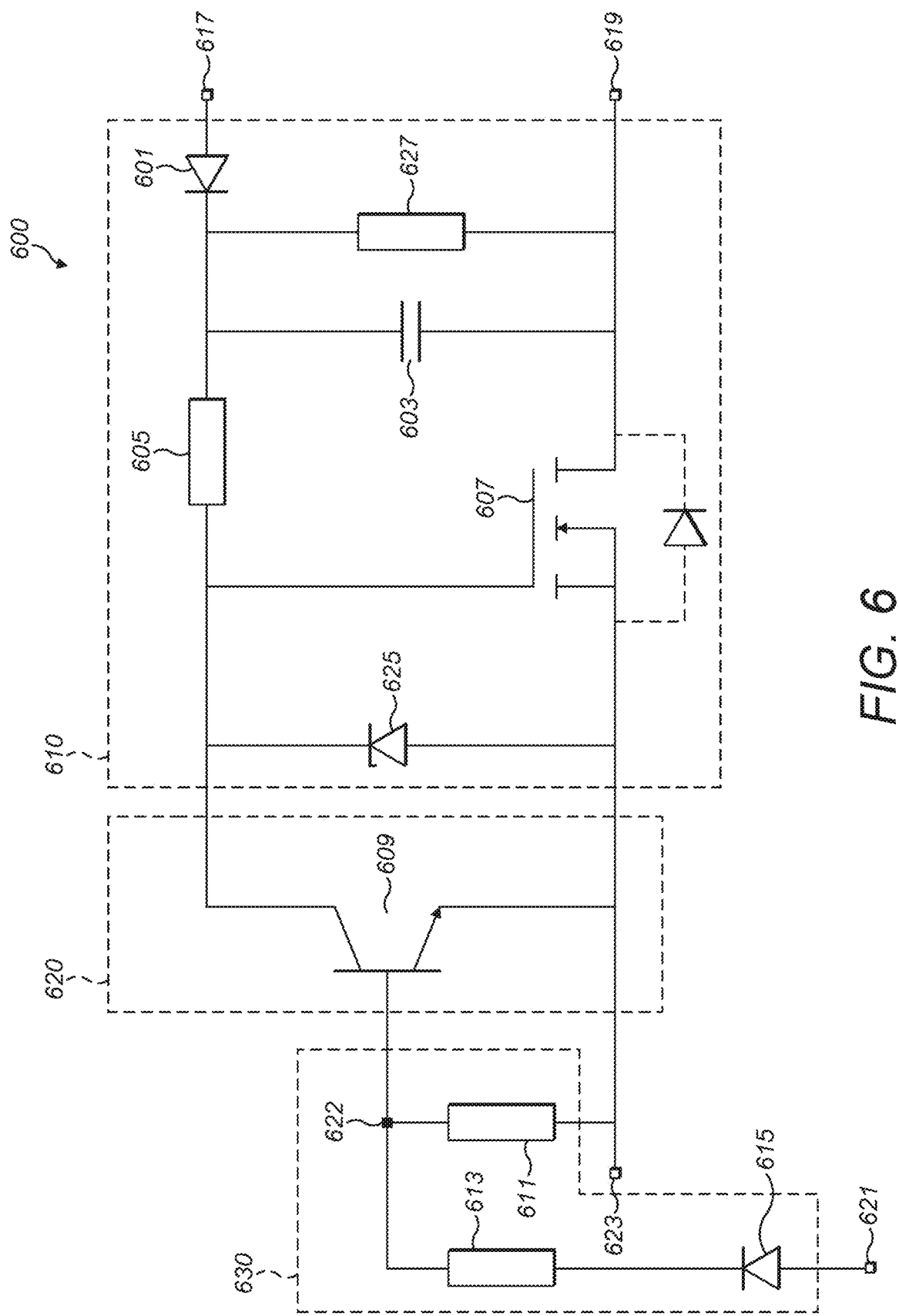
FIG. 6 shows a preferred embodiment of the present invention which can be applied to an isolated converter, such as a flyback converter.

FIG. 6 shows a further preferred embodiment of a reverse polarity protection circuit 600 which is suitable for connection to an isolated DC-DC converter such as a flyback converter, and including an isolating circuit 610, a clamping circuit 620 and a voltage limiting circuit 630.

The circuit operates in exactly the same manner as the circuit of FIG. 5, however, a resistor 627 is connected in parallel with output terminals 617 and 619 and a smoothing capacitor 603. The diode 601, smoothing capacitor 603, and resistor 627 create an RCD snubber (Resistor, Capacitor, Diode Snubber). An RCD snubber is often used in circuits which can present transient voltage spikes, such as circuits which include magnetically linked inductors.

The circuit according to FIG. 6 can be configured to take advantage of the comparable RCD snubber components already present in a flyback converter. A Zener diode 625 is again present to protect the gate of the protection transistor 607.

The above described examples are particularly suited for automotive applications, but will also have benefits and advantages to any converter in an electrical system where the input and output share a common negative or ground connection.

Throughout the specification, the terms typically connected and correctly connected are used to indicate a power supply connected to a converter with correct polarity. The term reverse connected is used to indicate a power supply connected to a converter with reverse polarity.

The circuit can be applied to a number of types of converter. References to a diode may refer to any other component capable of forward biasing a circuit, or to an arrangement of components designed to have the same effect.

References in the preceding examples to a PNP or NPN transistor may be understood to also refer to, respectively, P or N channel field effect transistors (FETs), or any other switch capable of having the desired effect, such as an operational amplifier.

References in the preceding examples to a capacitor may be understood to refer to any type of capacitor of a suitable size and voltage rating, such as a ceramic, film, power film, or electrolytic capacitor.

Preferred embodiments of the present invention may take the form of an embedded converter device, wherein the windings are disposed around a magnetic core embedded in a substrate. The converter device may advantageously be used as part of power switching electronic devices.

Described above are a number of preferred embodiments with various optional features. It should be appreciated that, with the exception of any mutually exclusive features, any combination of one or more of the optional features are possible.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A reverse polarity protection circuit for a DC-DC converter, the reverse polarity protection circuit comprising:
    an isolating circuit including a protection switch including a control input, the isolating circuit is configured to connect to a first supply line of the DC-DC converter, and operable to control current flow in the first supply line via the control input of the protection switch;
    a clamping circuit including a clamping switch including a control input, the clamping circuit is configured to selectively connect the control input of the protection switch to the first supply line; and
    a voltage limiting circuit configured to reduce a voltage between the control input of the clamping switch and the first supply line of the DC-DC converter; wherein when the DC-DC converter is connected to a power supply with correct polarity, the isolating circuit allows current to flow in the first supply line, and when the DC-DC converter is connected with reverse polarity, the clamping circuit turns off the protection switch to block current flow in the first supply line.

2. The reverse polarity protection circuit of claim 1, wherein the voltage limiting circuit includes a protection resistor connected between the first supply line of the DC-DC converter and the control input of the clamping switch.

3. The reverse polarity protection circuit of claim 2, wherein
    the clamping switch includes a clamping transistor, and
    the protection resistor is connected in parallel across a base/emitter junction or a gate/drain junction of the clamping transistor.

4. The reverse polarity protection circuit of claim 3, further comprising a resistor and a rectifier in series between a second supply line and the control input of the clamping switch.

5. The reverse polarity protection circuit of claim 1, wherein the isolating circuit further includes:
    a rectifier configured to connect to an output of an inductive component, to allow current to flow from the output of the inductive component to the reverse polarity protection circuit;
    a smoothing capacitor connected between the rectifier and an input to the inductive component; and
    a current limiting resistor connected between the rectifier and the control input of the protection switch.

6. The reverse polarity protection circuit of claim 5, wherein the protection switch includes a protection transistor, and the control input of the protection switch is a base or a gate of the protection transistor.

7. The reverse polarity protection circuit of claim 3, wherein a collector or a source of the clamping transistor is connected to the control input of the protection switch.

8. The reverse polarity protection circuit of claim 1, further comprising an isolating circuit protection device.

9. The reverse polarity protection circuit of claim 8, wherein the isolating circuit protection device includes a Zener diode connected between the control input of the protection switch and the first supply line.

10. The reverse polarity protection circuit of claim 5, further comprising a snubber resistor connected in series with the smoothing capacitor.

11. The reverse polarity protection circuit of claim 1, wherein the protection switch includes a MOSFET.

12. The reverse polarity protection circuit of claim 1, wherein the protection switch includes a bipolar junction transistor and a diode configured to allow current flow towards an inductive component.

13. The reverse polarity protection circuit of claim 1, wherein the clamping switch includes a bipolar junction transistor.

14. The reverse polarity protection circuit of claim 1, wherein the voltage limiting circuit is configured to limit the voltage between the first supply line and the control input of the clamping switch to about 6 V or less.

15. The reverse polarity protection circuit of claim 4, wherein the rectifier includes a diode.

16. A DC-DC converter comprising an inductive component and the reverse polarity protection circuit according to claim 1.

17. The DC-DC converter of claim 16, wherein the converter is one of a SEPIC converter or a buck/boost converter of an isolated converter.

18. A method of reverse polarity protection for a DC-DC converter having an inductive component, the method comprising:
- connecting a protection switch including a control input to a first supply line of the DC-DC converter;
- using an output of the inductive component to control current flow in the first supply line of the DC-DC converter via the control input of the protection switch;
- using a clamping switch including a control input to selectively connect the control input of the protection switch to the first supply line of the DC-DC converter;
- using a voltage limiting circuit to reduce a voltage between the control input of the clamping switch and the first supply line of the DC-DC converter;
- allowing current to flow in the first supply line when the DC-DC converter is connected to a power supply with correct polarity; and
- using the clamping switch to turn off the protection switch to block current flow in the first supply line when the DC-DC converter is connected to a power supply with reverse polarity.

19. The reverse polarity protection circuit of claim 1, wherein the first supply line is a positive supply line when the converter is connected to a power supply with correct polarity, and is a 0 V supply line when the converter is connected to a power supply with negative polarity.

* * * * *